United States Patent [19]

Emma et al.

[11] Patent Number: 5,197,139
[45] Date of Patent: Mar. 23, 1993

[54] CACHE MANAGEMENT FOR MULTI-PROCESSOR SYSTEMS UTILIZING BULK CROSS-INVALIDATE

[75] Inventors: Philip G. Emma, Danbury, Conn.; Joshua W. Knight, Mohegan Lake; James H. Pomerene, Chappaqua, both of N.Y.; Thomas R. Puzak, Ridgefield, Conn.; Rudolph N. Rechtschaffen, Scarsdale, N.Y.; Frank J. Sparacio, Sarasota, Fla.

[73] Assignee: International Business Machines Corporation, Armonk, N.Y.

[21] Appl. No.: 505,198

[22] Filed: Apr. 5, 1990

[51] Int. Cl.⁵ .............. G06F 12/10; G06F 12/16
[52] U.S. Cl. ........................ 395/400; 395/425; 364/246.6; 364/243.0; 364/256.5; 364/256.4; 364/DIG. 1
[58] Field of Search .............. 395/425, 400; 364/200 MS File

[56] References Cited

U.S. PATENT DOCUMENTS

| | | | |
|---|---|---|---|
| 3,735,360 | 5/1973 | Anderson et al. | 395/250 |
| 4,142,234 | 2/1979 | Bean et al. | 395/425 |
| 4,394,731 | 7/1983 | Flusche et al. | 395/425 |
| 4,399,506 | 8/1983 | Evans et al. | 395/425 |
| 4,400,770 | 8/1983 | Chan et al. | 395/400 |
| 4,445,174 | 4/1984 | Fletcher | 395/425 |
| 4,463,420 | 7/1984 | Fletcher | 395/425 |
| 4,464,712 | 8/1984 | Fletcher | 395/425 |
| 4,484,267 | 11/1984 | Fletcher | 395/425 |
| 4,503,497 | 3/1985 | Krygowski et al. | 395/425 |
| 4,513,367 | 4/1985 | Chan et al. | 395/425 |
| 4,622,631 | 11/1986 | Frank et al. | 395/800 |
| 4,654,778 | 3/1987 | Chiesa etal. | 395/425 |
| 4,755,930 | 7/1988 | Wilson, Jr. et al. | 395/425 |
| 4,775,955 | 10/1988 | Liu | 395/425 |
| 4,797,814 | 1/1989 | Brenza | 395/425 |
| 4,920,478 | 4/1990 | Furuya et al. | 395/425 |
| 4,928,225 | 4/1990 | McCarthy et al. | 395/425 |
| 4,942,578 | 7/1990 | Nakamura | 395/425 X |
| 4,977,498 | 12/1990 | Rastegar et al. | 395/425 |
| 4,991,090 | 2/1991 | Emma et al. | 395/575 |
| 5,016,168 | 5/1991 | Liu | 395/375 |
| 5,023,776 | 6/1991 | Gregor | 395/425 |
| 5,025,366 | 6/1991 | Bardr | 395/425 |
| 5,029,070 | 7/1991 | McCarthy et al. | 395/425 |
| 5,032,985 | 7/1991 | Curran et al. | 395/650 |

*Primary Examiner*—Joseph L. Dixon
*Assistant Examiner*—Michael A. Whitfield
*Attorney, Agent, or Firm*—Whitham & Marhoefer

[57] ABSTRACT

A store through cache environment managed exclusively grants exclusivity on a large granularity basis. A cross-invalidate is realized for all changed lines via a single transmission when exclusivity is released. A dynamic table that operates in conjunction with a directory look-aside table (DLAT) determines a number of pages that can be held exclusive simultaneously. For adequate operating speed, the special table must be either fully associative or at least set associative. Alternatively, the table can be incorporated into the DLAT. Each DLAT entry is also extended to include a set of "resident" bits and a "valid nonresident" bit. When exclusively is released, the set of local change bits is broadcast to all processors. Upon receipt of such broadcast, the appropriate action is to change the "valid nonresident" indication to read-only and to clear residence bits whose corresponding local change bit is set.

7 Claims, 5 Drawing Sheets

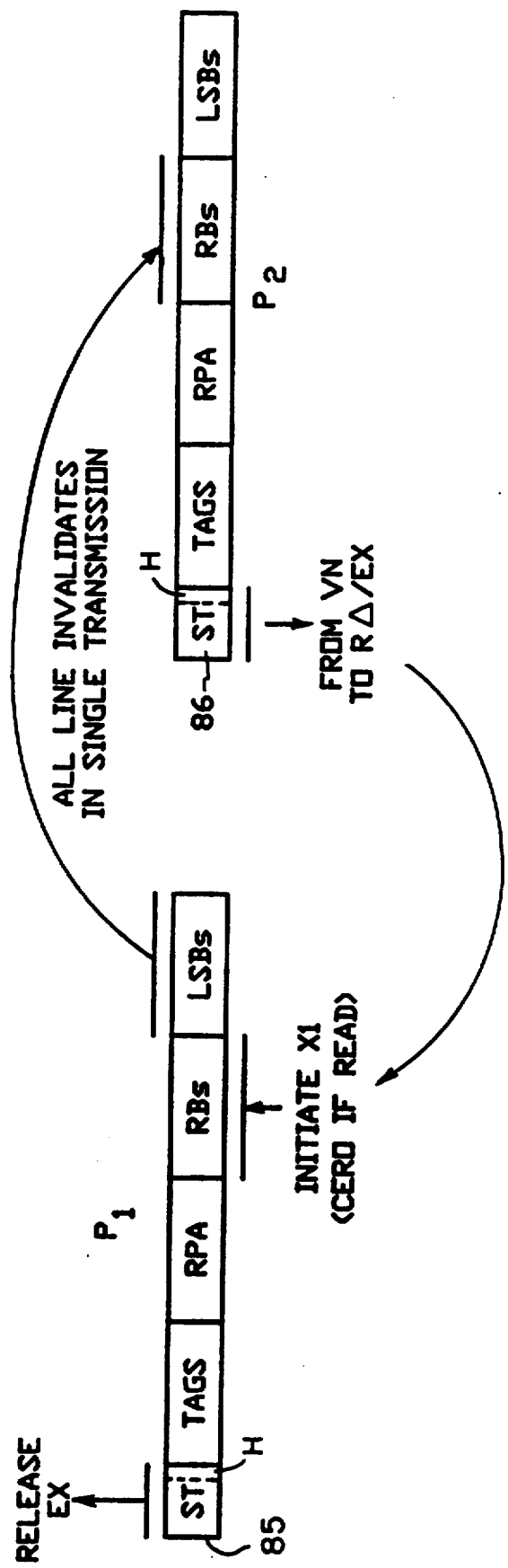

CACHE MANAGEMENT FOR MULTI-PROCESSOR SYSTEMS UTILIZING BULK CROSS-INVALIDATE

CROSS-REFERENCE TO RELATED APPLICATION

This application is related in subject matter to application Ser. No. 07/313,695 filed Feb. 22, 1989, by Lishing Liu for "Multi-Processor Caches with Large Granularity Exclusivity Locking", which application is assigned to the assignee of this application. The disclosure of application Ser. No. 07/313,695 is incorporated herein by reference.

BACKGROUND OF THE INVENTION

1. Field of the Invention

The present invention generally relates to store-through cache memory management for multi-processor systems and, more particularly, to a store-through environment managed exclusively, using for example Write-Through, Write-Allocate with eXclusive (WTWAX) management, in which exclusivity is granted on a large granularity (say, pages) basis. The invention realizes an XI (cross-invalidate) for all changed lines via a single transmission when exclusivity is released.

2. Description of the Prior Art

High performance, multi-processor (MP) computer systems are being developed to increase throughput by performing in parallel those operations which can run concurrently on separate processors. Such high performance, MP computer systems are characterized by multiple central processors (CPs) operating independently and in parallel, but occasionally communicating with one another or with a main storage (MS) when data needs to be exchanged. The CPs and the MS have input/output (I/O) ports which must be connected to exchange data.

In the type of MP system known as the tightly coupled multi-processor system in which each of the CPs have their own caches, there exist coherence problems at various levels of the system. More specifically, inconsistencies can occur between adjacent levels of a memory hierarchy. The multiple caches could, for example, possess different versions of the same data because one of the CPs has modified its copy. It is therefore necessary for each processor's cache to know what has happened to lines that may be in several caches at the same time. In a MP system where there are many CPs sharing the same main storage, each CP is required to obtain the most recently updated version of data according to architecture specifications when access is issued. This requirement necessitates constant monitoring of data consistency among caches.

A number of solutions have been proposed to the cache coherence problem. Early solutions are described by C. K. Tang in "Cache System Design in the Tightly Coupled Multiprocessor System", *Proceedings of the AFIPS* (1976), and L. M. Censier and P. Feautrier in "A New Solution to Coherence Problems in Multicache Systems", *IEEE Transactions on Computers*, Dec. 1978, pp. 1112 to 1118. Censier et al. describe a scheme allowing shared writable data to exist in multiple caches which uses a centralized global access authorization table. However, as the authors acknowledge in their Conclusion section, they were not aware of similar approaches as described by Tang two years earlier. While Tang proposed using copy directories of caches to maintain status, Censier et al. proposed to tag each memory block with similar status bits.

These early approaches revolve around how to do bookkeeping in order to achieve cross-interrogates (XI) when needed. The idea was to record at the global directory (copies or memory tags) information about which processor caches owns a copy of a line, and which one of the caches has modified its line. The basic operation is to have the global table record (with a MODIFIED bit) status when a processor stores into a line. Since store-in caches are used, the processor cache controller knows, from its cache directory, which lines are modified or private. A store into a non-modified line at a processor will necessitate synchronization with the storage controller and obtaining the MODIFIED status first. Therefore, a storage block cannot be exclusive, or modifiable, for a processor unless the processor has actually issued a store into it, even when the cache has the only copy of the line in the system.

The EX status in a more general sense, as described in U.S. Pat. No. 4,394,731 to Flusche et al., can allow a processor to store into the cache without talking to the storage control element (SCE), even when the line was never stored into the cache. This is a subtle difference but is rather important from a conceptual point of view, since it allows, for example, in an IBM/3081 system, acquiring EX status of a line at a processor when a subsequent store is "likely" to come.

There are various types of caches in prior art MP systems. One type of cache is the store through (ST) cache as described in U.S. Pat. No. 4,142,234 to Bean et al. for the IBM System/370 Model 3033 MP. ST cache design does not interfere with the CP storing data directly to the main storage (or second level cache) in order to always update changes of data to main storage. Upon the update of a store through to main storage, appropriate cross-interrogate (XI) actions may take place to invalidate possible remote copies of the stored cache line. The storage control element (SCE) maintains proper store stacks to queue the main storage (MS) store requests and standard communications between buffer control element (BCE) and SCE will avoid store stack overflow conditions. When the SCE store stack becomes full, the associated BCE will hold its MS stores until the condition is cleared.

Another type of cache design is the store-in cache (SIC) as described, for example, in U.S. Pat. No. 3,735,360 to Anderson et al. and U.S. Pat. No. 4,771,137 to Warner et al. A SIC cache directory is described in detail in the aforementioned U.S. Pat. No. 4,394,731 to Flusche et al. in which each line in a store-in cache has its multi-processor shareability controlled by an exclusive/read only (EX/RO) flag bit. The main difference between ST and SIC caches is that, all stores in SIC are directed to the cache itself (which may cause a cache miss if the stored line is not in the SIC cache). It is also proposed in U.S. Pat. No. 4,503,497 that data transfers upon a miss fetch can take place through a cache-to-cache transfer (CTC) bus if a copy is in the remote cache. A SCE is used that contains copies of the directories in each cache. This permits cross-interrogate (XI) decisions to be resolved at the SEE. Usually, cache line modifications are updated to main storage only when the lines are replaced from the cache.

In conventional cross-interrogate (XI) methods, when a block B is locked EX for CP $P_i$, any existing first level lines covered by block B in remote caches will be invalidated. When the block size is bigger than first level line size, this often results in redundant cross-invalidates (XIs); i.e., lines get invalidated without being modified at other CPs. The overhead due to extra cache misses and directory handling becomes intolerable when the block size is much (e.g., 16 times) bigger than the line size.

From experiments, significant spatial localities have been observed for both fetches and stores. Performing EX locking with bigger granularity blocks is able to reduce the rate of Non-EX-stores significantly. As a result, it is valuable to be able to perform large granularity EX locking without causing the above-mentioned performance overhead. The aforementioned application Ser. No. 07/313,695 describes in more detail the performance saving realized by large granularity exclusive locking. The present invention builds on that environment to further enhance the performance of cache management in a multiprocessor system.

SUMMARY OF THE INVENTION

It is therefore an object of the present invention to provide in a store through environment using large granularity exclusive locking a cross-invalidate for all changed lines via a single transmission when exclusivity is released.

It is another object of the invention to provide a cache management system in which exclusivity is granted on a large granularity and allows remote copies of lines to remain resident while a given processor holds a page exclusive thereby avoiding future misses for lines with the page that are not changed.

It is a further object of the invention to provide a cache management system that allows remote copies of lines to remain resident but not accessible while a processor holds a page exclusive and, upon release of exclusivity, a set of local change bits is broadcast to all processors to invalidate those lines which have been changed, and the status of the page at a remote processor is changed to read only or exclusive, depending on how the prior status of the page at the remote processor.

According to the invention, a dynamic table that operates in conjunction with a directory look-aside table (DLAT), sometimes referred to a translation lookaside buffer (TLB), determines a number of pages that can be held exclusive simultaneously. An entry in the table comprises a real page address, a "valid entry" and a set of "local change" bits (LCBs). For adequate operating speed, the special table must be either fully associative or at least set associative. Alternatively, the dynamic table may be integrated into the DLAT.

The invention is predicated on a "valid nonresident" state in remote DLATs which offers the additional advantages of reducing misses and reducing XI complexity at the time that exclusivity is granted. More particularly, each DLAT entry is also extended to include a set of "resident" bits and a "valid nonresident" bit. Exclusivity is granted on a page basis. Initially, all LCBs are turned off. Residence of a line is indicated by the conjunction of the appropriate residence bit in the DLAT and the valid bit in the cache directory. A store to a line causes the appropriate local change bit to be set. When exclusivity is released, the set of local change bits is broadcast to all processors. Upon receipt of such broadcast, an appropriate action is to change the "valid nonresident" indication to read-only and to clear residence bits whose corresponding local change bit is set. If a history bit is added to record the prior status of the page (i.e., read only or exclusive), then the page may resume the prior status at the remote processor upon release of exclusivity.

The invention is described in terms of a preferred embodiment in which the invention is implemented in a virtual cache. It will be understood by those skilled in the art, however, that the invention readily applies quite directly to any real cache implementation.

BRIEF DESCRIPTION OF THE DRAWINGS

The foregoing and other objects, aspects and advantages will be better understood from the following detailed description of a preferred embodiment of the invention with reference to the drawings, in which:

FIG. 6 is a block diagram illustrating the operation of the invention upon a release of exclusivity operation.

DETAILED DESCRIPTION OF PREFERRED EMBODIMENTS OF THE INVENTION

Figure 1:
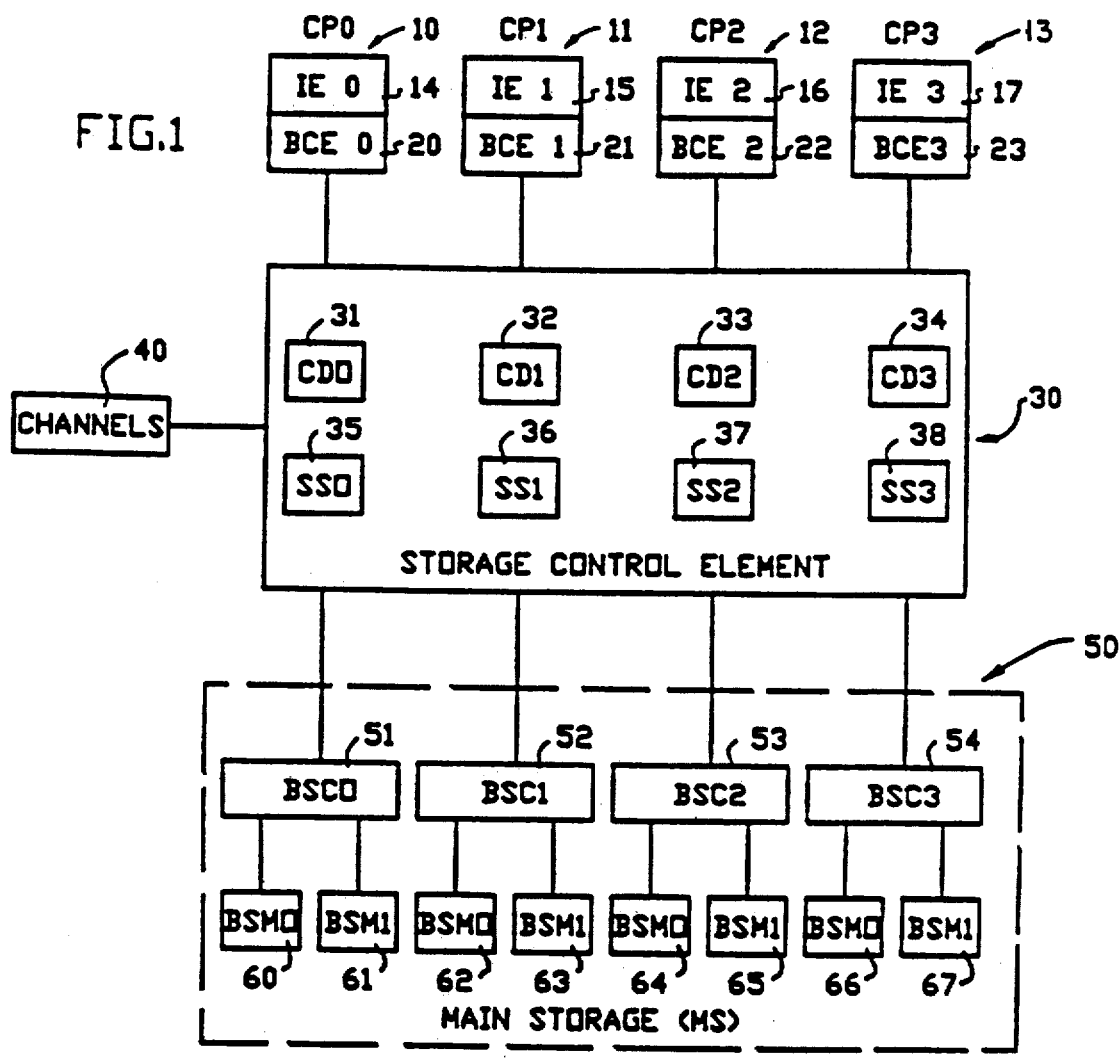
FIG. 1 is a block diagram of a multi-processing system in which the present invention may be used.

Referring now to the drawings, and more particularly to FIG. 1, there is illustrated in block diagram form a multi-processor (MP) system of the type in which the invention may be used. The MP system comprises four central processors ($CP_0$, $CP_1$, $CP_2$, and $CP_3$) 10, 11, 12, and 13 in which each CP includes an instruction execution (IE) unit 14, 15, 16, and 17 and buffer control unit (BCE) 20, 21, 22, and 23, respectively. Each IE unit includes hardware and microcode that issue instructions that require the fetching and storing of operands in main storage (MS) 50.

The IE units 14 to 17 begin a fetching or storing operation by issuing a fetch or store command to their respective cache controls BCEs 20 to 23, which include a processor store through (ST) cache with its associated processor cache directory (PD) and all processor cache controls which are exclusively used by their associated CPs 10 to 13. The CP generally issues a fetch or store command for each doubleword (DW) unit required by an operand. If the cache line containing the DW is in the PD, which is a cache hit, the DW is fetched or stored in the cache in accordance with the command. For an operand fetch hit in cache, the storage access is completed without any need to go outside of the BCE. Occasionally, the required DW is not in the cache, which results in a cache miss. Before the IE fetch or store command can be completed, the DW must be fetched from the main storage. To do this, the BCE generates a corresponding fetch or store miss command which requests the storage control element (SCE) 30 to obtain from main storage 50 a unit of data having the DW required by the IE unit. The unit of data (e.g., a page) will be located in the main storage 50 on a unit boundary, but the required DW will be the first DW in the fetched line to be returned to the requesting BCE in order to keep the IE request going before the completion of the missed transfer.

SCE 30 connects to the CPs 10 to 13 and main storage 50. Main storage 50 is comprised of a plurality of basic storage module (BSM) controllers $BSC_0$, $BSC_1$, $BSC_2$, and $BSC_3$ (51, 52, 53, and 54, respectively) in which each basic storage controller connects to two BSMs 0 (60, 62, 64, and 66) and 1 (61, 63, 65, and 67). The four BSCs 51 to 54 are each connected to the SCE 30.

In prior systems, the SCE 30 contains four copy directories (CDs) 31, 32, 33, and 34, each containing an image of the contents of a corresponding processor cache directory (PD) in one of the BCEs in a manner similar to that described in U.S. Pat. No. 4,394,731 to Flusche et al. As described in the aforementioned application Ser. No. 07/313,695, it is not necessary to employ CDs, although it is possible to further reduce the amount of XI-invalidates through other directories recording line presence information.

A doubleword-wide bidirectional data bus is provided between each BSM 60 to 67 in main storage and corresponding SCE port, and from SCE ports to I/O channel processor 40 and each of the corresponding CPs 10 to 13. Along with the data busses, there are also separate sets of command busses for control and address signals. When a CP encounters a cache miss for a DW access request, its BCE initiates a line access request to main storage by sending a miss command to SCE 30, which then reissues the command to a required BSM in main storage. In the event of a BSM busy condition, SCE 30 will save the request in a command queue and will reissue it at a later time hen the required BSM 60 to 67 becomes available. SCE 30 also sequences the main storage commands in an orderly fashion so that all commands to a particular BSM are issued in first-in, first-out (FIFO) order, except when a cache conflict is found by its XI logic. During the normal sequence of handling a main storage request, SCE 30 constantly monitors the status of main storage, analyzes the interrogation results of protection key and all cache directories, examines updated status of all pending commands currently being held in SCE 30, and also looks for any new BCE commands that may be waiting in BCE 20 to 23 to be received by SCE 30.

SCE 30 maintains a plurality of store stacks ($SS_0$, $SS_1$, $SS_2$, and $SS_3$) 35, 36, 37, and 38, each for holding of main storage store requests of up to 16 DWs for a corresponding CP. SCE 30 keeps enough directory information for the store stacks for the indication of main storage addresses and validity. When a store stack risks overflow, SCE 30 sends a priority request to the associated BCE 20 to 23 to hold the sending of more store requests until the BCE receives a later signal from SCE 30 clearing the store stack full condition. Data in the store stacks are updated to main storage with appropriate scheduling maintaining the incoming order within each store stack. A line fetch request from a CP is held by SCE 30 until the SCE makes sure that all existing stores to the line in the store stacks have been sent to the associated BSM 60 to 67.

The conventional way of recording EX states in cache directory entries can be quite costly. For instance, consider a second level cache with 32K entries. If the SCE maintains three bits per second level entry for the EX status, it requires 100K bits, plus the required bits in first level directories. As described in more detail in the aforementioned application Ser. No. 07/313,695, it is possible to reduce such circuit costs by using relatively small lock tables. For each processor $P_i$ $\{P_i| 1<\_i<\_n\}$, the SCE maintains a lock table, which is normally structured as a set-associative table indexed (or hashed) via addresses or can be implemented as a simple first-in, first-out (FIFO) stack. For each entry of the lock table, there is an ID field (plus an appropriate validity tag), which records the address of a block B. The SCE also maintains the necessary status arrays for replacement operations on the lock tables. Each entry of a lock table represents the EX locking of a block for a corresponding processor. Initially, all entries in the lock tables are invalid. The block size b needs not be the same as the first or second level cache line size, although it is normally an integral multiple of the first level cache line size.

Consider the store synchronization mechanism at the SCE for typical ST caches, in which each store from a CP needs to be synchronized with the SCE. The basic operations at the SCE are as follows. First consider the handling by the SCE for store synchronization request (on block B) from processor $P_i$:

(a.1) When block B hits in a lock table $T_i$, the store synchronization is granted to the corresponding processor $P_i$ immediately.

(a.2) When block B is not in any of the lock tables, the SCE creates a new entry for B in lock table $T_i$ and grants the store synchronization to processor $P_i$. In parallel to the above process, the SCE also sends out signals (to CPs that may contain data of block B) to XI-invalidate B in remote caches.

(a.3) When block B hits to lock table $T_j$ (j=/i), this is similar to Remote-EX-hit at the SCE. In this case, the entry of block B is deleted from lock table $T_j$ while a new entry is created in lock table $T_i$ (with XI-invalidate signal sent to processor $P_j$).

Then consider the operations when the SCE receives a fetch request (e.g., a first level cache miss) for a line in block B from processor $P_i$:

(a.4) When block B is not locked EX by remote CPs, the fetch can be initiated without delay.

(a.5) When block B hits to lock table $T_j$ (where j=/i), the block B entry is invalidated from lock table $T_j$ first.

In the store through cache design, it is important that a line (miss) fetch be carried out without any stores to the line pending in store stack(s). This kind of checking by the SCE is needed when a line fetch request is received.

Among the above steps, (a.1) may be done in parallel for multiple stores from different CPs. Proper serialization may be needed at the SCE when other steps are executed, although this does not preclude the possibility of performing more than one store synchronization request in the same cycle. As the locking granularity b becomes bigger (e.g., 4K), the XI-invalidates, from steps (a.2) and (a.3), will cause severe first level cache misses.

A store-through cache need not have exclusive control. There are three basic types of store-through caches; WTWAX (for "Write-Through, Write-allocate with exclusive management"), WTWA (for "Write- Through, Write-Allocate" (without exclusive management)), and WTNWA (for "Write-Through, No Write-Allocate" (without exclusive management)).

For all intents and purposes, a WTWAX cache operates exactly like a store-in cache, except that the stores are stored-through to the main memory at the time that they are issued, and consequently there are no castouts. Since each store is issued to main memory as a separate event, the SCE is required to honor the stores from a given processor in the order that they are issued (no ordering of stores from different processors is required). Note that in a store-in cache, the SCE need not concern itself with this, since the ordering between the individual stores is inherently handled by the castout.

A WTWA cache operates like a WTWAX cache, with the exception that there is no exclusive management. A WTNWA cache, like the WTWA cache, does not have exclusive management. Without such management, a processor must follow more stringent rules to ensure coherency between caches. The subject invention is implemented in a store-through environment managed exclusively, and therefore for purposes of this description, a WTWAX cache is assumed.

Figure 2:
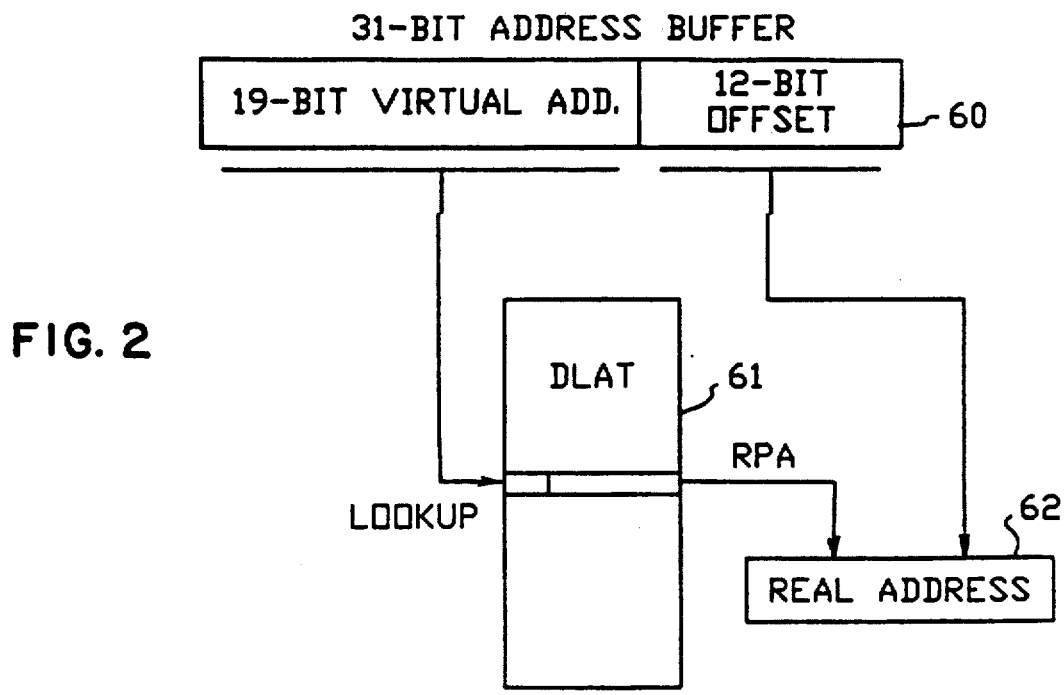
FIG. 2 is a block diagram showing the DLAT architecture and illustrating the cache access path.

To understand the present invention, it is necessary to describe the process of virtual to real address translation as performed in modern computer systems. As illustrated in FIG. 2, a 31-bit address buffer 60, such as used in the IBM 3090 series computers, is divided into a 19-bit virtual address and a 12-bit offset. The offset is the address of the desired byte in the page. The nineteen high order bits must be translated to obtain the real address of the byte in question. This accomplished by a director lookaside table (DLAT, sometimes referred to as a translation lookaside buffer (TLB)) 61. The DLAT is a cache within the cache containing the most recent page translations. If an entry is found in the DLAT, the output is the real page address (RPA) which is combined in register 62 with the twelve low order bits from address buffer 60 to form the real address.

Besides providing a translation, the DLAT contains a valid bit, a storage ID (STO ID), and an address tag (a portion of the virtual address), in addition to the real page address. The valid bit, the STO ID and address tag are all needed to recognize a hit. The address tag is required because the entries in the DLAT are set associative. In addition, there may be other optional storage keys stored with an entry in the DLAT.

Figure 3:
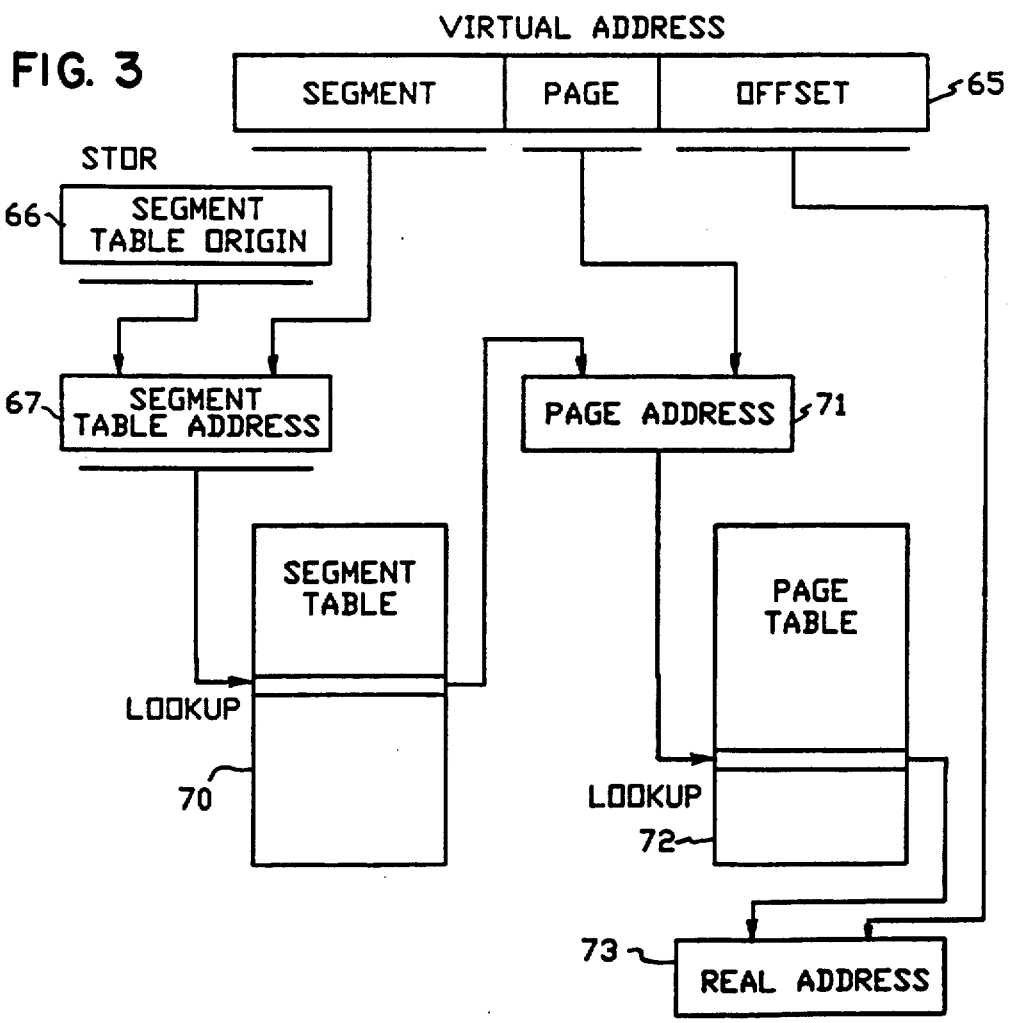
FIG. 3 is a block diagram showing the segment and page table architecture and illustrating the translation from virtual to real address.

If there is no entry in the DLAT, then the virtual address must be translated. This is done by the architecture shown in FIG. 3. The virtual address is temporarily stored in a buffer 65. The virtual address is divided into segment and page portions. A store table origin register (STOR) 66 contains a segment table origin. The output of register 66 is combined with the segment data of the virtual address in register 67 to generate a segment table address. The segment table address is used to lookup the page table origin in segment table 70. The page table origin is combined with the page data of the virtual address in register 71 to generate a page address. The page address is used to lookup the page frame number, and the page frame number or real page address (RPA) is combined with the offset from the register 65 in register 73 to generate the real address. In addition, the RPA from the page table 72 is added to the DLAT 61 using a least recently used (LRU) algorithm.

Figure 4:
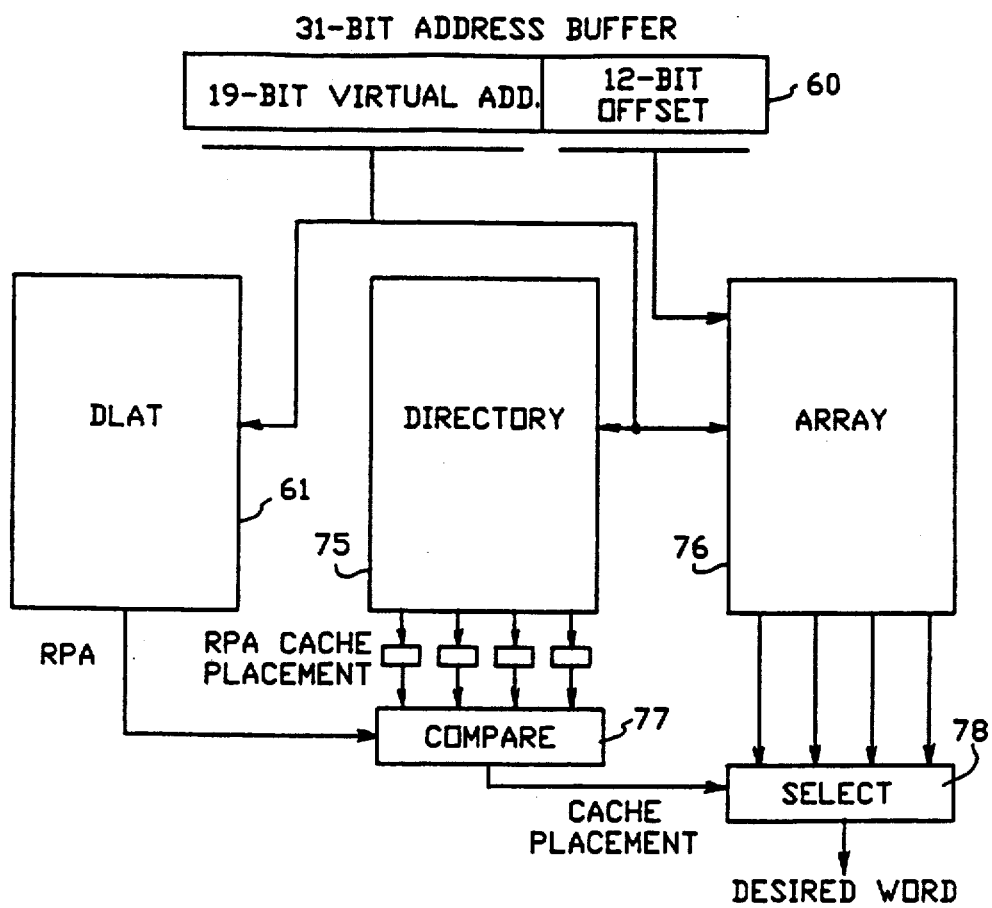
FIG. 4 is a diagram of the cache showing the architecture of the DLAT, directory and array and illustrating the manner of accessing a desired word in the array.

FIG. 4 shows the architecture of the cache as containing, in addition to the DLAT 61, a directory 75 and the cache array 76. Each directory entry corresponds to one line in the array. The directory entries contain a valid bit, and EX/RO bit and tags which are associated with recognizing a hit, as well as the array set ID. The array set ID identifies where in the array 76 the data is stored. Each DLAT entry corresponds to one page. In the example of the IBM 3090 series of computers, there are thirty-two lines per page, since one word then contains one bit per line, and a line is 128 bits. The virtual address from address buffer 60 addresses each of the DLAT 61, the directory 75 and the cache array 76. The array 76 additionally is addressed by the low order offset bits from the address buffer 60. The directory 75 provides several RPA cache placement candidates since it is set associative. Four such candidates are illustrated, but the number could vary depending on a specific application. The RPA from the DLAT 61 is compared with each of the candidates in the compare circuits 77, and the cache placement output from the compare circuits 77 is used to select the correct output from the array 76.

Those skilled in the art will recognize that the architecture and operation described thus far is conventional, but it is necessary to understand this architecture as a background for an understanding of the invention. For more information on virtual address translation, see Harvey M. Deitel, *An Introduction to Operating Systems*, Addison-Wesley (1984), and Harold Lorin and Harvey M. Deitel, *Operating Systems*, Addison-Wesley (1981).

The specific improvement according to the invention is that, with each DLAT entry, there is included one word comprising thirty-two residence bits, one per line, and a single bit indicating "nonresident", and thirty-two local change bits (LCBs), one per line of the page. The single "nonresident" bit overrides the thirty-two residence bits for the entire page. We refer to this bit as a "valid-nonresident" bit as opposed to invalid. It allows lines to be retained in cache, although not accessible.

Figure 5A:
FIG. 5A is a block representation of a DLAT entry in a prior art.
Figure 5B:
FIG. 5B is a block representation of a DLAT entry according to the present invention.
Figure 5C:
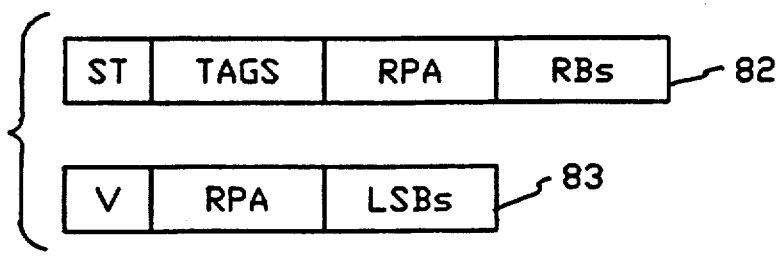
FIG. 5C is a block representation of a DLAT entry and table entry according to another aspect of the invention.

FIG. 5A illustrates an example of an old DLAT entry 80 as comprising a valid bit (V), tags (a portion of the virtual address), and the real page address (RPA). In one aspect of the invention, the DLAT entry 81 is modified as shown in FIG. 5B to include, in addition to the tags and RPA, status bits (ST), residence bits (RBs), and local change bits (LCBs). Alternatively, as shown in FIG. 5C, the DLAT entry 82 includes only the status bits, tags, RPA, and RBs, and a separate, smaller table includes entries 83 containing a valid bit (V), the RPA and LCBs. The two approaches illustrated by FIGS. 5B and 5C are entirely equivalent, the latter being somewhat more complex but with the advantage that the total memory requirements are reduced.

According to the invention, the operation of the cache is nominal WTWAX with the following exceptions:

1. Exclusivity is granted on a page basis and is indicated via insertion of the relevant information into the table described above. This is a form of large granularity locking as described in the aforementioned application Ser. No. 07/313,695. Initially, all local change bits should be off.

2. Residence of a line is indicated by the conjunction of the appropriate residence bit in the DLAT entry and the valid bit in the cache directory.

3. A store to a line causes the appropriate local change bit to be set.

4. When exclusivity is released (either via CERO (change exclusive to read-only) or via an entry aging out of the table described above), the set of local change bits is broadcast to all processors. Upon receipt of such a broadcast, the appropriate action is to change the "valid nonresident" indication to read-only and to clear residence bits whose corresponding (received) local change bit is set. (Residence bits need not be cleared in the initiating processor.

Figure 7:
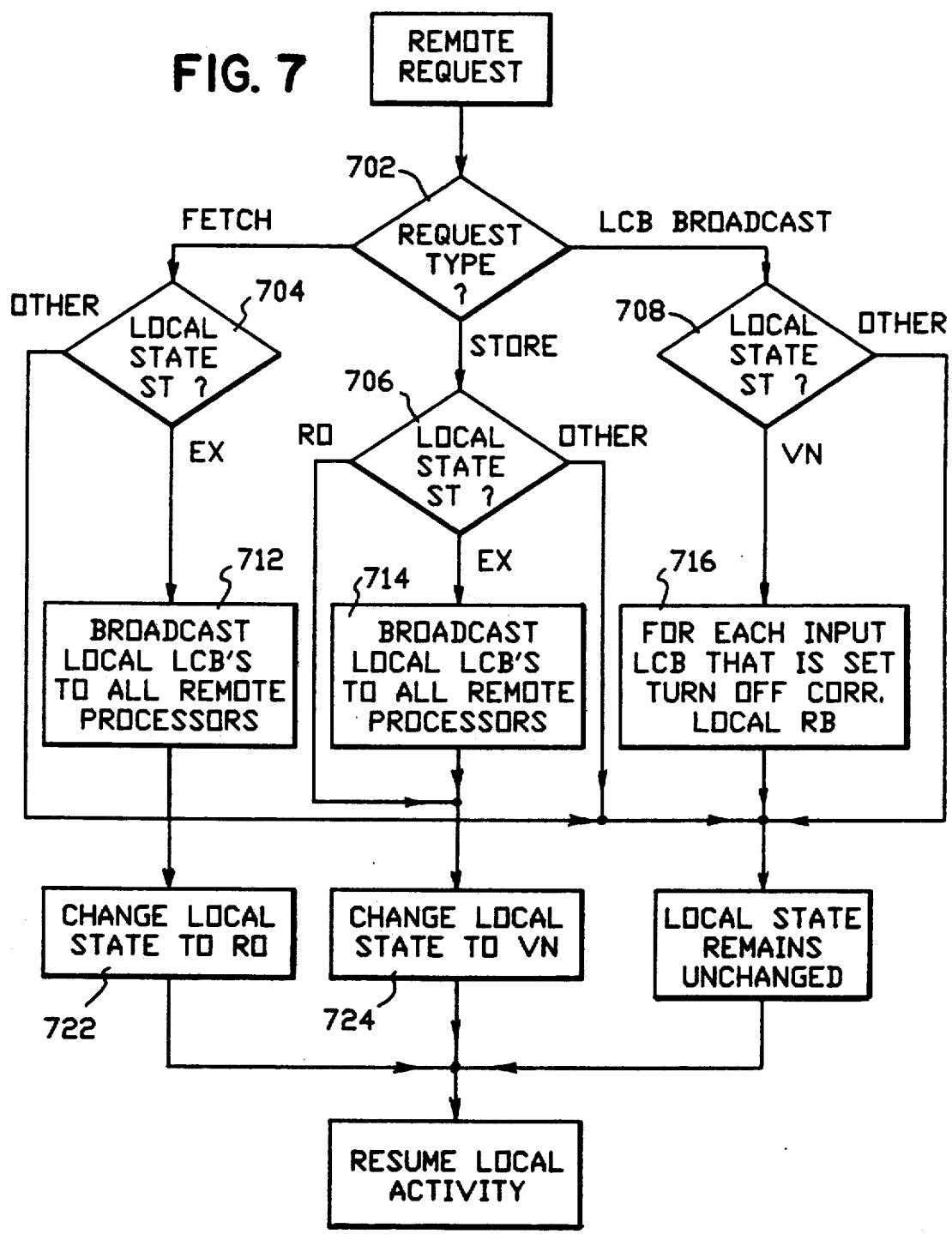
FIG. 7 is a flow chart illustrating the sequence of operations of FIG. 6 as carried out locally at a processor.

The process is illustrated in FIG. 6 and FIG. 7. FIG. 6 shows a DLAT entry 85 for processor $P_1$ and a corresponding DLAT entry 86 for processor $P_2$. FIG. 7 illustrates the process steps of FIG. 6 as carried out at either processor $P_1$ or $P_2$. Therefore, as indicated by parenthetical reference numerals, different paths will be followed through FIG. 7 at different processors. Assuming that processor $P_1$ holds a page exclusive (702 and one of 704 and 706) and then releases the exclusive state (722 or 724), a single broadcast of LCBs (712 or 714) from DLAT entry 85 invalidates all lines written to by processor $P_1$ (708, referenced to the other (e.g. remote) processors) in the DLAT entry 86 by resetting the residence bits (RBs) (716, also referenced to the other (e.g. remote) processor) for those lines. The release of exclusive status by processor $P_1$ (722 or 724) may be as a result of aging at $P_1$ or as a result of a cross-interrogate (XI) or CERO from processor $P_2$. When exclusive or read only status is granted to (remote) processor $P_2$, the status bits change from valid nonresident (VN) to EX or RO, as the case may be. The corresponding status bits in the DLAT entry for processor $P_1$ change to VN or RO (722 or 724).

In the general case, the status bits ST comprise two bits which encode the following status conditions:
 00—Invalid
 01—Valid Nonresident
 10—Read Only
 11—Exclusive If exclusive status is released by one processor due to aging and another processor formerly held the page either exclusive or read only, then upon release of exclusivity, the appropriate action is to set the valid nonresident status to read only status at the other processor. However, if the other processor formerly held the page exclusive, there can be some applications where the status is returned to exclusive, rather than read only. To do this requires one more status bit, referred to as a "history" bit H. This bit is set to a "1" if the page is held exclusive. Thus, when exclusivity is released, a "1" history bit causes the valid nonresident status to change to exclusive, rather than read only.

The advantages of the scheme according to the invention are twofold. First, a single transmission suffices to invalidate all lines that have been changed within a page (rather than one transmission per changed line). Second, the "valid nonresident" state allows remote copies of lines to remain resident while a given processor holds the page exclusive and, thus, future misses are avoided for lines within the page that are not changed.

While the invention has been described in terms of a preferred embodiment wherein the invention is implemented in a virtual cache, those skilled in the art will recognize that the invention can be practiced in any real cache implementation within the spirit and scope of the appended claims.

Having thus described our invention, what we claim as new and desire to secure by Letters Patent is as follows:

1. A store through cache architecture for a tightly coupled multi-processor system comprising a plurality of processors and a main storage, each of said processors having a cache comprising:
 a dynamic lookaside table storing a plurality of virtual address translations, said dynamic lookaside table being addressed by a virtual address and providing as an output a real page address;
 said dynamic lookaside table having a plurality of entries, each of said entries including, in addition to a real page address, status bits recording read only, exclusive, invalid, and valid nonresident status, residence bits recording residence of individual lines in a page, and local change bits recording those lines in the page which have been written to during exclusive resident status; and
 transmission means connecting each of said caches for transmitting a single word containing said local change bits upon release of exclusivity by one processor for invalidating corresponding residence bits in the dynamic lookaside table entices in dynamic lookaside tables in other processors.

2. The store through cache architecture recited in claim 1 wherein said dynamic lookaside table is implemented in two separate tables, a first one of said tables including said status bits and a second one of said tables including said local change bits, and the presence of an entry in the second one of said tables signifying exclusive status.

3. The store through cache architecture recited in claim 1 further comprising:
 a set associative cache directory addressed by said virtual address and providing as an outputs cache placement candidates;
 means for comparing said real page address with said cache placement candidates and providing as an output a cache placement;
 a cache array addressed by said virtual address and an offset, said cache array providing as outputs a plurality of words, said cache directory having an entry for each line of said cache array, said entry including a valid bit, residence of a line being indicated by the conjunction of read only or exclusive status with an appropriate residence bit in said dynamic lookaside table and the valid bit in said cache directory; and,
 means responsive to said cache placement for selecting one of said words as a desired word output from the cache.

4. A cache management process for a tightly coupled multi-processor system comprising a plurality of processors and a main storage, each of said processors having a cache including a dynamic lookaside table storing translations of virtual addresses to real page addresses, each entry in said dynamic lookaside table including, in addition to a real page address, status bits indicating exclusive, read only, invalid, or valid nonresident status, residence bits for each line of a page, and local change bits for each line of a page, said management process comprising the steps of:
 granting exclusive status on a page basis to one of said processors and resetting all local change bits for that processor and concurrently retaining any copies of the page at other processors with a valid nonresident status;
 setting local change bits for those lines written to during said exclusive status; and
 upon release of exclusive status, broadcasting in a single transmission said local change bits to all other processors and invalidating residence bits for those lines written to, thereby allowing remote copies of lines to remain resident while said one processor holds the page exclusive and avoiding future misses for lines within the page that are not changed.

5. The cache management process as recited in claim 4 wherein each of said caches include, in addition to said dynamic lookaside table, a cache directory having an entry for each line of cache, said entry including a valid bit, said process further comprising the step of determining residence of a line by the conjunction of an appropriate residence bit in the dynamic lookaside table and the valid bit in the cache directory.

6. The cache management process as recited in claim 5 further comprising the step of changing the status bits of said remote copies to read only concurrently with the step of invalidating residence bits for those line written to.

7. The cache management process recited in claim 5 wherein said status bits further include a history bit recording a prior status of read only or exclusive and further comprising the step of changing the status bits of a remote copy to exclusive in accordance with said history bit concurrently with the step of invalidating residence bits for those lines written to.

* * * * *